United States Patent [19]

Dunnavant et al.

[11] Patent Number: 4,540,724

[45] Date of Patent: Sep. 10, 1985

[54] PHENOLIC RESIN-POLYISOCYANATE BINDER SYSTEMS CONTAINING A PHOSPHORUS HALIDE AND USE THEREOF

[75] Inventors: William R. Dunnavant, Columbus; John J. Gardikes, Worthington; Heimo J. Langer, Columbus, all of Ohio

[73] Assignee: Ashland Oil Inc., Ashland, Ky.

[21] Appl. No.: 575,208

[22] Filed: Jan. 30, 1984

[51] Int. Cl.³ .................... C08G 18/54; C08G 8/28; C08G 18/28; C08G 18/32

[52] U.S. Cl. ..................................... 523/143; 164/16; 164/21; 164/521; 164/527; 523/141; 524/595; 524/313; 524/115; 524/142; 525/504; 528/51; 528/158

[58] Field of Search .............. 528/158, 51; 525/504; 523/141, 143; 524/595, 313, 115, 142; 164/21, 521, 527, 16

[56] References Cited

U.S. PATENT DOCUMENTS

| | | |
|---|---|---|
| 3,087,912 | 4/1963 | Wagner et al. . |
| 3,144,419 | 8/1964 | Guttag ............................ 525/504 X |
| 3,245,922 | 4/1966 | Worsley et al. . |
| 3,268,467 | 8/1966 | Rye et al. ......................... 524/595 X |
| 3,377,317 | 4/1968 | Hoxie . |
| 3,384,606 | 5/1968 | Dieterich et al. . |
| 3,409,579 | 11/1968 | Robins . |
| 3,429,848 | 2/1969 | Robins . |
| 3,476,696 | 11/1969 | Quinn . |
| 3,485,797 | 12/1969 | Robins . |
| 3,527,725 | 9/1970 | Strauss et al. ................... 528/158 X |
| 3,676,392 | 7/1972 | Robins . |
| 3,686,101 | 8/1972 | Davis et al. . |
| 3,905,934 | 9/1975 | Gardikes . |
| 4,079,031 | 3/1978 | Sardessai et al. . |
| 4,116,916 | 9/1978 | Holik . |
| 4,209,433 | 6/1980 | Hse ..................................... 524/595 |
| 4,246,157 | 1/1981 | Laitar . |
| 4,268,425 | 5/1981 | Gardikes . |
| 4,311,815 | 1/1982 | Heine . |
| 4,358,570 | 11/1982 | Tobinaga . |
| 4,436,881 | 3/1984 | Laitar ................................. 525/504 |

*Primary Examiner*—Howard E. Schain
*Attorney, Agent, or Firm*—Pollock, Vande Sande & Priddy

[57] ABSTRACT

A binder containing a phenolic resin; a polyisocyanate; a curing component, and a phosphorus halide and use thereof.

21 Claims, No Drawings

PHENOLIC RESIN-POLYISOCYANATE BINDER SYSTEMS CONTAINING A PHOSPHORUS HALIDE AND USE THEREOF

DESCRIPTION

1. Technical Field

The present invention relates to binder compositions, methods for curing such binder compositions, and use thereof. The binder compositions of the present invention are especially useful as molding compositions such as refractories, abrasive articles, and molding shapes such as cores and molds. The preferred binder compositions of the present invention are especially useful in obtaining foundry shapes which exhibit improved bench life. The binder compositions are capable of being cured at room temperature, by a gaseous curing agent.

2. Background Art

U.S. Pat. Nos. 3,409,579 and 3,676,392 disclose binder compositions made available as two-package systems comprising a resin component in one package and a hardener component in the other package. The resin component comprises an organic solvent solution of a phenolic resin. The hardener component comprises a liquid polyisocyanate having at least two isocyanate groups per molecule. At the same time the contents of the two packages are combined and then mixed with the sand aggregate or preferably the packages are sequentially admixed with sand aggregate. After a uniform distribution of the binder on the sand particles has been obtained, the resulting foundry mix is molded into the desired shape. In U.S. Pat. No. 3,409,579 the molded shape is cured by passing a gaseous tertiary amine through it. In U.S. Pat. No. 3,676,392, curing is effected by means of a base having a pKb value in the range of about 7 to about 11 as determined by a method described by D. D. Perrin in Dissociation Constants of Organic Bases in Aqueous Solution (Butterworths, London 1965). The base is introduced originally into the resin component before it is mixed with hardener, or it may be introduced as the third component of a three-package binder system comprising in separate packages the resin component, the hardener, and the base.

In both U.S. Pat. Nos. 3,409,579 and 3,676,392 the preferred phenolic resins are benzylic ether resins. These are the condensation products of a phenol having the general formula:

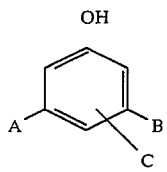

wherein A, B, and C are hydrogen, hydrocarbon radicals, oxyhydrocarbon radicals, or halogen with an aldehyde having the general formula R'CHO wherein R' is a hydrogen or a hydrocarbon radical of 1 to 8 carbon atoms, prepared in the liquid phase under substantially anhydrous conditions at temperatures below about 130° C. in the presence of catalytic concentrations of a metal ion dissolved in the reaction medium. The preparation and characterization of these resins is disclosed in greater detail in U.S. Pat. No. 3,485,797.

The phenolic resin component of the binder composition is, as indicated above, generally employed as a solution in an organic solvent.

The second component or package of the binder composition comprises an aliphatic, cycloaliphatic, or aromatic polyisocyanate having preferably from 2 to 5 isocyanate groups. If desired, mixtures of polyisocyanates can be employed. Less preferably, isocyanate prepolymers formed by reacting excess polyisocyanate with a polyhydric alcohol, e.g., a prepolymer of toluene diisocyanate and ethylene glycol, can be employed. Suitable polyisocyanates include the aliphatic polyisocyanates such as hexamethylene diisocyanate, alicyclic polyisocyanates such as 4,4'-dicyclohexylmethane diisocyanate, and aromatic polyisocyanates such as 2,4' and 2,6-toluene diisocyanate, diphenylmethane diisocyanate, and dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenol isocyanates, chlorophenylene-2,4-diisocyanate, and the like. Although all polyisocyanates react with the phenolic resin to form a cross-linked polymer structure, the preferred polyisocyanates are aromatic polyisocyanates and particularly diphenylmethane diisocyanate, triphenylmethane triisocyanate, and mixtures thereof.

The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80% by weight of the solution.

In order to extend the bench life of the above binder systems before being combined with the catalytic component various materials have been suggested. Phthaloyl chloride is currently being commercially employed for such purpose but is not entirely satisfactory. The bench life can be defined as the maximum permissible time delay between mixing the binder components together in sand and the production of acceptable products therefrom.

DESCRIPTION OF INVENTION

The present invention in the use of phosphorus halides provides for improved bench life of the molding compositions as compared to the use of the commercially employed phthaloyl chloride. In addition, the compositions exhibit satisfactory strength characteristics.

The present invention is concerned with a binder composition which comprises a resin component, a hardener component, a curing component and a phosphorus halide. The resin component includes a non-aqueous phenolic resin which comprises a condensation product of a phenol with an aldehyde. The phenol has the formula:

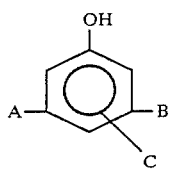

wherein A, B and C are hydrogen, or hydrocarbon radicals or halogen. At least about 5 mole percent of the phenol is a nonyl phenol.

The aldehyde has the formula R'CHO wherein R' is a hydrogen or hydrocarbon radical of 1 to 8 carbon atoms. The hardener component comprises liquid polyisocyanate containing at least two isocyanate groups.

The present invention is also concerned with molding compositions which comprises a major amount of aggregate; and an effective bonding amount up to about 40% by weight of the aggregate of the binder composition described hereinabove.

Moreover, the present invention is concerned with fabricating foundry shapes which comprises mixing foundry aggregate with a bonding amount of up to about 10% by weight based upon the weight of the aggregate of the binder composition described hereinabove. The foundry mix is introduced in a pattern and hardened to become self-supporting. The shaped foundry mix is removed from the pattern and allowed to further cure to thereby obtain a hard, solid, cured foundry shape.

Furthermore, the present invention is concerned with a process for casting a metal. The process comprises fabricating a foundry shape as discussed hereinabove and pouring the metal while in the liquid or molten state into or around the shape. The metal is allowed to cool and solidify and is then separated from the molded article.

BEST AND VARIOUS MODES FOR CARRYING OUT THE INVENTION

The phosphorus halides employed according to the present invention can be organic or inorganic phosphorus halides and are preferably chloride. The preferred halides employed are phosphorus trichloride ($PCl_3$); phosphorus pentachloride ($PCl_5$); phosphorus oxychloride ($POCl_3$); phenylphosphonic dichloride

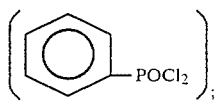

and benzene phosphorus dichloride

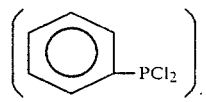

Mixtures of phosphorus halides can be used when desired.

The amount of phosphorus halide employed is usually about 0.05 to about 5% based upon the weight of the binder composition; and preferably about 0.1 to about 1% based upon the weight of the binder.

The binder compositions which are benefited by use of this invention are known to the art and are those which contain certain phenolic resin and polyisocyanate combinations.

Such phenolic/isocyanate binder systems are admixed at or about the time of use in the presence of sand. Typically, the reactive ingredients of such binder compositions are sold, shipped and stored in separate packages (i.e., a multiple package core binder) to avoid undesirable deterioration due to premature reaction between the components. Solvents, catalysts, various additives and other known binders can optionally be used in conjunction with these essential ingredients, i.e., used with the phenolic resin and the isocyanate.

The phenol content of the phenolic resins employed must include at least 5 mole percent and preferably about 5 to about 30 mole percent of a nonyl phenol and preferably paranonyl phenol. Phenolic resins from only phenol in combination with the phosphorus halide, although exhibiting some improvement in benchlife, do not exhibit the significant improved benchlife achieved by the present invention. The phenolic resins are substantially free of water and are organic solvent soluble. In addition to containing nonyl phenol, the phenolic component includes any one or more of the the phenols which have heretofore been employed in the formation of phenolic resins and which are not substituted at either the two ortho-positions or at one ortho- and the para-position, such unsubstituted positions being necessary for the polymerization reaction. Any one, all, or none of the remaining carbon atoms of the phenol ring can be substituted. The nature of the substituent can vary widely, and it is only necessary that the substituent not interfere in the polymerization of the aldehyde with the phenol at the ortho- and/or para-positions. Substituted phenols employed in the formation of the phenolic resins include: alkyl-substituted phenols, aryl-substituted phenols, cyclo-alkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 12 carbon atoms. Specific examples of suitable phenols include: phenol, 2,6 xylenol, o-cresol, m-cresol, p-cresol, 3,5-xylenol, 3-4-xylenol, 2,3,4-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Such phenols can be described by the general formula:

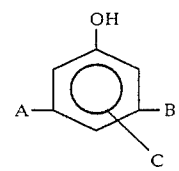

wherein A, B, and C are hydrogen, hydrocarbon radicals, oxyhydrocarbon radicals, or halogen.

The preferred phenol component employed is a mixture of phenol with the nonyl phenol.

The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The phenolic resins employed in the binder compositions can be either resole or A-stage resins or novolac resins. The resitole or B-stage resins, which are a more highly polymerized form of resole resins, are generally unsuitable. The phenolic resin employed must be liquid or organic solvent-soluble. Solubility in organic solvent is desirable to achieve uniform distribution of the binder on the aggregate. The substantial absence of water in the phenolic resin is desirable in view of the reactivity of the binder composition of the present invention with water. The term "non-aqueous" or substantially water-free as employed herein is meant to define a phenolic resin which contains less than 5 percent of water and preferably less than 1 percent of water based on the weight of the resin. Mixtures of phenolic resins can be used.

Although both the resole resins and the novolak resins can be employed in the binder compositions of the present invention, and when admixed with polyisocyanates and a foundry aggregate and cured by use of catalysts form cores of sufficient strength and other properties to be suitable in industrial applications, the resole resins are preferred over the novolak resins. The preparation of resole resins is known in the art and for that reason not specifically referred to herein.

The phenolic resin component of the binder composition is, as indicated above, generally employed as a solution in an organic solvent. The nature and the effect of the solvent will be more specifically described below. The amount of solvent used should be sufficient to result in a binder composition permitting uniform coating thereof on the aggregate and uniform reaction of the mixture. The specific solvent concentrations for the phenolic resins will vary depending on the type of phenolic resins employed and its molecular weight. In general, the solvent concentration will be in the range of up to 80 percent by weight of the resin solution and preferably in the range of 20 to 80 percent. It is preferred to keep the viscosity of the first component at less than X-1 on the Gardner-Holt Scale.

The second component or package of the binder composition comprises an aliphatic, cycloaliphatic, or aromatic polyisocyanate having preferably from 2 to 5 isocyanate groups. If desired, mixtures of organic polyisocyanates can be employed. Suitable polyisocyanates include the aliphatic polyisocyanates such as hexamethylene diisocyanate, alicyclic polyisocyanates such as 4,4'-dicyclohexylmethane diisocyanate, and the dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenol isocyanates, chlorophenylene-2,4-diisocyanate, and the like. Although all polyisocyanates react with the phenolic resin to form a cross-linked polymer structure, the preferred polyisocyanates are aromatic polyisocyanates and particularly diphenylmethane diisocyanate, triphenylmethane triisocyanate, and mixtures thereof. Mixtures of isocyanates can be used.

The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis is employed. The polyisocyanate is employed in liquid form. Liquid polyisocyanates can be employed in undiluted form. Solid or viscous polyisocyanates are employed in the form of organic solvent solutions, the solvent being present in a range of up to 80 percent by weight of the solution. Most preferably the isocyanate is employed in a stoichiometric amount ± about 20% based on the available hydroxyl groups of the phenolic resin.

The difference in the polarity between the polyisocyanate and the phenolic resins restricts the choice of solvents in which both components are compatible. Such compatibility is necessary to achieve complete reaction and curing of the binder compositions of the present invention. Polar solvents of either the protic or aprotic type are good solvents for the phenolic resin, but have limited compatibility with the polyisocyanates. Aromatic solvents, although compatible with the polyisocyanates, are less compatible with the phenolic resins. It is therefore preferred to employ combinations of solvents and particularly combinations of aromatic and polar solvents. Suitable aromatic solvents are benzene, toluene, xylene, ethylbenzene and mixtures thereof. Preferred aromatic solvents are mixed solvents that have an aromatic content of at least 90 percent and a boiling point range of 280° to 450° F. The polar solvents should not be extremely polar such as to become incompatible with the aromatic solvent. Suitable polar solvents are generally those which have been classified in the art as coupling solvents and include furfural, furfuryl alcohol, Cellosolve acetate butyl Cellosolve, butyl Carbitol, diacetone alcohol, and "Texanol".

In addition the compositions can include drying oils such as disclosed in U.S. Pat. No. 4,268,425. Such drying oils include glycerides of fatty acids which contain two or more double bonds whereby oxygen on exposure to air can be absorbed to give peroxides which catalyze the polymerization of the unsaturated portions. Examples of some natural drying oils include soybean oil, sunflower oil, hemp oil, linseed oil, tung oil, oiticia oil and fish oils, and dehydrated castor oil, as well as the various known modifications thereof (e.g., the heat bodied air-blown, or oxygen-blown oils such as blown linseed oil and blown soybean oil). The above discussion concerning the oils is not intended to imply that such actually cure in the present system by air drying but is intended to help define the drying oils.

Also, esters of ethylenically unsaturated fatty acids such as tall oil esters of polyhydric alcohols such as glycerine or pentaerythritol or monohydric alcohols such as methyl and ethyl alcohols can be employed as the drying oil. If desired, mixtures of drying oils can be employed. The preferred drying oil employed in the present invention is linseed oil.

The amount of the drying oil employed is generally at least about 2%, preferably about 2% to about 15%, and most preferably about 4% to about 10% by weight based upon the total of the components in the binder composition. The drying oil can be considered part of the solvent component of the composition.

In addition, the solvent component can include liquid dialkyl ester such as dialkyl phthalate of the type disclosed in U.S. Pat. No. 3,905,934. Such preferably have the structure:

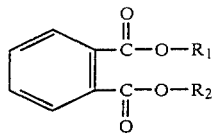

where $R_1$ and $R_2$ are alkyl radicals of 1 to 12 carbon atoms and the total number of carbon atoms in the R groups does not exceed 16. Preferably $R_1$ and $R_2$ are alkyl radicals of 3 to 6 carbon atoms and the total number of carbon atoms in $R_1$ and $R_2$ is between 6 and 12. Thus in the above structural formula, either R group can be methyl, ethyl, n-propyl, isopropyl, n-butyl, isobutyl, n-pentyl, isopentyl, hexyl, isohexyl, heptyl, isoheptyl, octyl, isooctyl, and other isomers of the foregoing.

Other dialkyl esters include dimethyl glutarate such as available from Du Pont under the trade designation DBE-5; dimethyl adipate available from Du Pont under the trade designation DBE-6, dimethyl succinate; and mixtures of such esters which are available from Du Pont under the trade designation DBE, and dialkyl adipates and succinates with alcohols up to 12 carbon atoms.

The binder compositions are preferably to be made available as a two-package system with the phenolic resin in one package and the isocyanate component in the other package with the drying oil. Usually, the binder components are combined and then admixed with sand or a similar aggregate to form the molding mix or the mix can also be formed by sequentially admixing the components with the aggregate. Methods of distributing the binder on the aggregate particles are well known to those skilled in the art. The mix can, optionally, contain other ingredients such as iron oxide, ground flax fibers, wood cereals, pitch, refractory flours, and the like.

When preparing an ordinary sand type foundry shape, the aggregate employed has a article size large enough to provide sufficient porosity in the foundry shape to permit escape of volatiles from the shape during the casting operation. The term "ordinary sand type foundry shapes" as used herein refers to foundry shapes which have sufficient porosity to permit escape of volatiles from it during the casting operation. Generally, at least about 80% and preferably about 90% by weight of aggregate employed for foundry shapes has an average particle size no smaller than about 50 and about 150 mesh (Tyler Screen Mesh). The aggregate for foundry shapes preferably has an average particle size between about 50 and 150 mesh (Tyler Screen Mesh). The preferred aggregate employed for ordinary foundry shapes is silica wherein at least about 70 weight percent and preferably at least about 85 weight percent of the sand is silica. Other suitable aggregate materials include zircon, olivine, aluminosilicate sand, chromite sand and the like.

When preparing a shape for precision casting, the predominant portion and generally at least about 80% of the aggregate has an average particle size no larger than 150 mesh (Tyler Screen Mesh) and preferably between about 325 mesh and 200 mesh (Tyler Screen Mesh). Preferably at least about 90% by weight of the aggregate for precision casting applications has a particle size no larger than 150 mesh and preferably between 125 mesh and 200 mesh. The preferred aggregates employed for precision casting applications are fused quartz, zircon sands, magnesium silicate sands such as olivine, and aluminosilicate sands.

When preparing a refractory such as a ceramic, the predominant portion and at least 80 weight percent of the aggregate employed has an average particle size under 200 mesh and preferably no larger than 325 mesh. Preferably at least about 90% by weight of the aggregate for a refractory has an average particle size under 200 mesh and preferably no larger than 325 mesh. The aggregate employed in the preparation of refractories must be capable of withstanding the curing temperatures such as above about 1,500° F. which are needed to cause sintering for utilization. Examples of some suitable aggregate employed for preparing refractories include the ceramics such as refractory oxides, carbides, nitrides, and silicides such as a aluminum oxide, lead oxide, chromic oxide, zirconium oxide, silica, silicon carbide, titanium nitride, boron nitride, molybdenum disilicide, and carbonaceous material such as graphite. Mixtures of the aggregate can also be used, when desired, including mixtures of metals and the ceramics.

Examples of some abrasive grains for preparing abrasive articles include aluminum oxide, silicon carbide, boron carbide, corundum, garnet, emery and mixtures thereof. The grit size is of the usual grades as graded by the United States Bureau of Standards. These abrasive materials and their uses for particular jobs are understood by persons skilled in the art and are not altered in the abrasive articles contemplated by the present invention. In addition, inorganic filler can be employed along with the abrasive grit in preparing abrasive articles. It is preferred that at least about 85% of the inorganic fillers has an average particle size no greater than 200 mesh. It is most preferred that at least about 95% of the inorganic filler has an average particle size no greater than 200 mesh. Some inorganic fillers include cryolite, fluorospar, silica and the like. When an inorganic filler is employed along with the abrasive grit, it is generally present in amounts from about 1 to about 30% by weight based upon the combined weight of the abrasive grit and inorganic filler.

Although the aggregate employed is preferably dry, it can contain small amounts of moisture, such as up to about 0.3% by weight or even higher based on the weight of the aggregate.

In molding compositions, the aggregate constitutes the major constituent and the binder constitutes a relatively minor amount. In ordinary sand type foundry applications, the amount of binder is generally no greater than about 10% by weight and frequently within the range of about 0.5 to about 7% by weight based upon the weight of the aggregate. Most often, the binder content ranges from about 0.6 to about 5% by weight based upon the weight of the aggregate in ordinary sand type foundry shapes. For casting of low melting point metals where shake-out and collapsibility are important, about 0.6 to about 1.5% by weight based upon the weight of the aggregate in ordinary sand type foundry shapes is preferably used.

In molds and cores for precision casting applications the amount of binder is generally no greater than about 40% by weight and frequently within the range of about 5 to about 20% by weight based upon the weight of the aggregate.

In refractories, the amount of binder is generally no greater than about 40% by weight and frequently within the range of about 5% to about 20% by weight based upon the weight of the aggregate.

In abrasive articles, the amount of binder is generally no greater than about 25% by weight and frequently within the range of about 5% to about 15% by weight based upon the weight of the abrasive material or grit.

Although the aggregate employed is preferably dry, moisture of up to about 1 weight percent based on the weight of the sand can be tolerated. This is particularly true if the solvent employed is non-water-miscible or if an excess of the polyisocyanate necessary for curing is employed, since such excess polyisocyanate will react with the water.

The molding mix is molded into the desired shape, whereupon it can be cured. Curing can be affected by passing a tertiary amine through the molded mix as described in U.S. Pat. No. 3,409,579.

A valuable additive to the binder compositions of the present invention in certain types of sand is a silane such as those having the general formula:

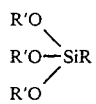

wherein R' is a hydrocarbon radical and preferably an alkyl radical of 1 to 6 carbon atoms and R is an alkyl radical, an alkoxy-substituted alkyl radical, or an alkyl-amine-substituted alkyl radical in which the alkyl groups have from 1 to 6 carbon atoms. The aforesaid silane, when employed in concentrations of 0.1 to 2% based on the phenolic binder and hardener, improves the humidity resistance of the system.

Examples of some commercially available silanes are Dow Corning Z6040 and Union Carbide A-187 (gamma glycidoxy propyltrimethoxy silane); Union Carbide A-1100 (gamma aminopropyltriethoxy silane); Union Carbide A-1120 (N-beta (aminoethyl)-gamma-aminopropyltrimethoxy silane); and Union Carbide A-1160 (Ureido-silane).

In order to further understand the present invention, the following non-limiting examples concerned with foundry are provided. All parts are by weight unless the contrary is stated. In all examples, the foundry samples are cured by the so-called "cold-box" process by contacting with dimethylethylamine.

EXAMPLE 1

The following is a typical procedure which can be employed to prepare resole type polymers suitable for use in accordance with the present invention.

Charge about 858.15 grams of phenol, about 223.25 grams of nonyl phenol containing at least about 90% by weight of para-nonyl phenol, about 418.05 grams of 91% para-formaldehyde, and about 0.6 grams of zinc acetate to a reaction vessel provided with a stirrer, thermometer and condenser. Instead of the zinc acetate catalyst, other metal catalysts as disclosed in U.S. Pat. No. 3,485,797 such as lead soaps of $C_9$–$C_{12}$ monocarboxylic acids; lead naphthenate and lead octoate may be employed. Heat the reaction mass up to about 112° to about 114° C. Hold at that temperature under reflux condition until the free formaldehyde is less than about 8%. This usually takes about one and one-half hours.

Heat under atmospheric dehydration conditions to about 125° C. until substantially all of the free formaldehyde has reacted (less than about 1% free formaldehyde). Then dehydrate under vacuum of 27" of Hg for about 10 minutes to obtain about 1286.9 grams of the desired product.

EXAMPLE 2

100 parts by weight of Martin Marietta Sand are admixed with about 0.75 parts of a phenolic resin composition of about 54% by weight of a phenolic resin prepared along the lines of Example 1; about 10% by weight of TXIB (2,2,4-trimethyl-1,3-pentanediol diisobutyrate); about 10% by weight of Texaco aromatic solvent 7545 (an aromatic solvent being an initial boiling point at (1BP) about 440° F., 10% at about 490° F.; 50% at about 510° F.; 90% at about 600° F.; and dry end point 700° F.); about 17.1% of HiSol 15 (an aromatic solvent available from Ashland Chemical Company); about 4.4% by weight of linseed oil; about 4.5% by weight of T-1215 (polymerized linseed oil) for about 2 minutes. To the mixture are admixed about 0.75 parts of an isocyanate composition of about 71% by weight of Mondur MR from Mobay; about 23.4% by weight of HiSol 15 and about 5.6% of kerosene, and about 0.55% by weight of $PCl_3$ based upon the total of the isocyanate composition for about 2 minutes. The foundry mix is aged under ambient conditions for 5 hours. After this, the resulting foundry mix is forced into a core box by blowing and contacting it with a catalyst such as an amine, thereby forming AFS tensile strength samples (dog bones) using the standard procedure. The composition exhibits a bench life of at least 5 hours.

The cured samples are tested for tensile strength. The average immediate tensile strength after the composition is aged for 5 hours under ambient conditions before curing is about 107 psi and after 24 hours is about 158 psi.

EXAMPLE 3

Example 2 is repeated except the phenolic composition contains about 54% by weight of the phenolic resin; about 14% by weight of TXIB; about 10% of Texaco 545; about 13.1% by weight of HiSol 15; about 4.4% by weight of linseed oil; and about 4.5% by weight of T-1215; and about 0.3% by weight of $POCl_3$ based upon the isocyanate composition in place of the $PCl_3$.

The bench life of the composition is at least 5 hours. The average immediate tensile strength after the composition is aged for 5 hours before curing is about 70 psi and after 24 hours is about 120 psi.

EXAMPLE 4

Example 3 is repeated except that about 0.45% of $POCl_3$ based upon the isocyanate composition is employed. The bench life of the composition is at least 5 hours. The average immediate tensile strength after the composition is aged for 5 hours before curing is about 92 psi and after 24 hours is about 135 psi.

EXAMPLE 5

Example 3 is repeated except that about 0.75% by weight of said $POCl_3$ based upon the isocyanate composition is employed. The bench life is at least about 5 hours. The average immediate tensile strength after the composition is aged for 5 hours before curing is about 122 psi and after 24 hours is about 157 psi.

EXAMPLE 6

Example 3 is repeated except that about 0.6% by weight of PCl₃ based upon the isocyanate composition is employed. The bench life is at least about 5 hours. The average immediate tensile strength after the composition is aged for 5 hours before curing is about 110 psi and after 24 hours about 70 psi.

EXAMPLE 7

Example 3 is repeated except about 0.4% by weight of PCl₅ based upon the isocyanate composition is employed. The bench life is at least about 5 hours. The average immediate tensile strength after the composition is aged for 5 hours before curing is about 85 psi and after 24 hours about 75 psi.

EXAMPLE 8

Example 3 is repeated except that about 0.6% by weight of POCl₃ in place of PCl₃, based upon the isocyanate composition is employed. The bench life is at least about 5 hours. The average immediate tensile strength after the composition is aged for 5 hours before curing is about 120 psi and after 24 hours about 163 psi.

EXAMPLE 9

Example 2 is repeated except that the phenolic composition contains about 50.94% by weight of the phenol resin, about 13.21% by weight of TXIB; about 9.43% by weight of Texaco 7545; about 18.02% by weight of HiSol 15; about 4.15% by weight of linseed oil and about 4.25% of polymerized linseed oil; and isocyanate composition contains about 71% by weight of Mondur MR; about 23.4% by weight of HiSol 15; about 5.6% by weight of kerosene; and about 0.76% of POCl₃ based upon the weight of the isocyanate composition. The bench life is at least 5 hours. The average immediate tensile strength after the composition is aged for 5 hours before curing is about 117 psi and after 24 hours is about 230 psi.

EXAMPLE 10

Example 2 is repeated except that the phenolic composition contains about 51% weight of phenol resin; about 14% by weight of TXIB, about 5% by weight of HiSol-15, about 22.2% by weight of Texaco 7545; about 4.4% by weight of linseed oil and about 3.4% by weight of polymerized linseed oil; the isocyanate composition contains about 75.2% by weight of Mondur MR; about 9.8% by weight of HiSol 15; about 9.2% by weight of Texaco 7545; and about 5.8% by weight of kerosene; and about 0.6% by weight of POCl₃ based upon the weight of the isocyanate composition. The amount of phenolic composition used is about 0.825 parts and the amount of isocyanate composition is about 0.675 parts.

The bench life is at least 5 hours. The average immediate tensile strength after the composition is aged is 5 hours before curing is about 110 psi and after 24 hours about 215 psi.

All of the above examples illustrate tensile strength obtained under the conditions tested which are considered acceptable for practical core and mold making applications.

What is claimed is:

1. A binder composition comprising in admixture a resin component, a hardener component, and a inorganic phosphorus halide, said resin component including a non-aqueous phenolic resin which comprises a condensation product of a phenol having the general formula:

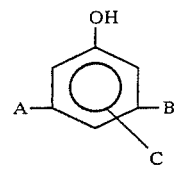

wherein A, B and C are hydrogen, hydrocarbon radicals, or halogen, wherein at least about 5 mole percent of said phenol is a nonyl phenol with an aldehyde having the general formula R'CHO wherein R' is a hydrogen or a hydrocarbon radical of 1 to 8 carbon atoms; said hardener component comprising liquid polyisocyanate containing at least two isocyanate groups.

2. The composition of claim 1 wherein said phosphorus halide is selected from the group of phosphorus trichloride, phosphorus pentachloride; and phosphorus oxychloride.

3. The composition of claim 1 wherein said phosphorus halide is phosphorus trichloride.

4. The composition of claim 1 wherein said phosphorus halide is phosphorus pentachloride.

5. The composition of claim 1 wherein said phosphorus halide is phosphorus oxychloride.

6. The composition of claim 1 wherein said phosphorus halide is employed in amounts of about 0.05% to about 5% by weight of the composition.

7. The composition of claim 1 wherein said phosphorus halide is employed in amounts of about 0.01% to about 1% by weight of the composition.

8. The composition of claim 1 wherein said nonyl phenol is para-nonyl phenol.

9. The composition of claim 1 wherein the amount of the nonyl phenol is about 5 to about 30 mole percent.

10. The composition of claim 1 wherein the amount of the nonyl phenol is about 10 mole percent.

11. The composition of claim 1 which further contains a drying oil.

12. A molding composition which comprises:
  A. a major amount of aggregate; and
  B. an effective bonding amount up to about 40% by weight of the aggregate of the binder composition of claim 1 and a curing component.

13. The composition of claim 12 wherein the amount of said binder composition is about 0.6 to about 5% based upon the weight of the aggregate.

14. A process for the fabrication of foundry shape which comprises:
  A. mixing foundry aggregate with a bonding amount of up to about 10% by weight based upon the weight of the aggregate of the binder composition of claim 1;
  B. introducing the foundry mix obtained from step (A) into a pattern;
  C. hardening the foundry mix in the pattern to become self-supporting; and
  D. thereafter removing the shaped foundry mix of step (C) from the pattern and allowing it to further cure, thereby obtaining a hard, solid, cured foundry shape.

15. The process of claim 14 wherein the amount of said binder composition is about 0.6 to about 5% based upon the weight of aggregate.

16. The process of casting a metal which comprises:

A. fabricating a shape in accordance with claim 14;

B. pouring said metal while in the liquid state into or around said shape;

C. allowing said metal to cool and solidify; and

D. then separating the molded article.

17. The composition of claim 12 wherein said curing agent is an amine gas.

18. The process of claim 14 wherein the foundry mix is hardened by contacting with an amine gas in a cold box process.

19. The composition of claim 1 wherein said polyisocyanate is selected from the group of diphenylmethane diisocyanate, triphenylmethane triisocyanate, or mixtures thereof.

20. The composition of claim 1 wherein said phenolic resin is a resole.

21. The composition of claim 13 wherein said aggregate is sand.

* * * * *